(12) United States Patent
Hellman et al.

(10) Patent No.: US 10,000,159 B2
(45) Date of Patent: Jun. 19, 2018

(54) STORAGE BIN SYSTEM FOR A MOTOR VEHICLE

(71) Applicant: FORD GLOBAL TECHNOLOGIES, LLC, Dearborn, MI (US)

(72) Inventors: Kristin Ann Hellman, Walled Lake, MI (US); Annette Lynn Huebner, White Lake, MI (US); Ryan Welch, Ottawa Lake, MI (US); Artur Sakarian, Ann Arbor, MI (US); Joshua Greiner, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/093,844

(22) Filed: Apr. 8, 2016

(65) Prior Publication Data

US 2017/0291553 A1 Oct. 12, 2017

(51) Int. Cl.
| | | |
|---|---|---|
| *B62B 1/12* | (2006.01) | |
| *B60R 7/08* | (2006.01) | |
| *B65D 25/28* | (2006.01) | |
| *B65D 81/38* | (2006.01) | |
| *F25D 3/08* | (2006.01) | |

(52) U.S. Cl.
CPC ............ *B60R 7/08* (2013.01); *B62B 1/12* (2013.01); *B65D 25/28* (2013.01); *B65D 81/3813* (2013.01); *F25D 3/08* (2013.01); *F25D 2303/081* (2013.01)

(58) Field of Classification Search
CPC ...... B60P 3/07; B60P 7/02; B60P 7/08; B60P 7/14; B62B 1/12
See application file for complete search history.

(56) References Cited

U.S. PATENT DOCUMENTS

| 4,789,195 A | * | 12/1988 | Fletcher | ................... B60R 11/06 |
| | | | | 224/404 |
| 5,848,818 A | * | 12/1998 | Flueckinger | .............. B60R 9/00 |
| | | | | 296/100.02 |
| 5,895,086 A | * | 4/1999 | Carico | ..................... B60R 11/06 |
| | | | | 296/37.15 |
| 6,003,923 A | | 12/1999 | Scott et al. | |
| 7,431,368 B2 | | 10/2008 | Henderson et al. | |
| 9,193,290 B2 | | 11/2015 | Lazarevich et al. | |
| 2004/0251704 A1 | * | 12/2004 | Rubel | ....................... B60R 7/02 |
| | | | | 296/26.01 |
| 2006/0279099 A1 | | 12/2006 | Ranka et al. | |
| 2010/0320245 A1 | * | 12/2010 | Vilkomirski | ............ B60R 9/065 |
| | | | | 224/404 |

FOREIGN PATENT DOCUMENTS

| CN | 204161219 U | 2/2015 |
| EP | 1659031 A1 | 5/2006 |

OTHER PUBLICATIONS

English Machine Translation of CN204161219U.
English Machine Translation of EP1659031A1.

* cited by examiner

*Primary Examiner* — John D Walters
*Assistant Examiner* — James J Triggs
(74) *Attorney, Agent, or Firm* — Vichit Chea; King & Schickli, PLLC

(57) ABSTRACT

A storage bin system is provided for a motor vehicle. That storage bin system includes a first cargo compartment sidewall having a first storage cavity with a first rearwardly oriented access opening. Further, the storage bin system includes a first removable storage bin received and held in the first storage cavity.

15 Claims, 10 Drawing Sheets

STORAGE BIN SYSTEM FOR A MOTOR VEHICLE

TECHNICAL FIELD

This document relates generally to the motor vehicle equipment field and, more particularly, to a storage bin system for a motor vehicle that provides easy-to-use storage bins that conveniently hold objects and prevent them from rolling around in the storage area of the motor vehicle. A new and improved method of storing an object in a motor vehicle is also provided.

BACKGROUND

The cargo area in sport utility vehicles (SUVs) typically does not include any compartments to hold various smaller items and prevent them from rolling around on the floor of the cargo area during vehicle operation or to prevent them from falling out of the storage area onto the ground when the liftgate is opened. Further, many SUVs do not include bins that provide a way to hide or lock items for additional security.

This document relates to a new and improved storage bin system for a motor vehicle that incorporates easy-to-access sliding bins which may be securely locked to protect items out of sight. Further, the bins may be removed from the vehicle thereby providing a convenient carrier for those items stored therein.

SUMMARY

In accordance with the purposes and benefits described herein, a storage bin system is provided for a motor vehicle. That storage bin system comprises a first cargo compartment sidewall including a first storage cavity having a first rearwardly oriented access opening and a first removable storage bin received and held in the first storage cavity. The first removable storage bin includes a first housing having a first portion that closes the first access opening when the first removable storage bin is stowed in the first storage cavity. Further, that portion is fully concealed when the liftgate of the motor vehicle is closed and fully exposed when the liftgate of the motor vehicle is opened.

A first handle may be provided on the first removable storage bin. That handle may project into the cargo area of the motor vehicle past the first cargo compartment sidewall when the first removable storage bin is stowed in the first rearwardly oriented access opening. In such an embodiment, the handle may function as a tie down anchor point.

The first removable storage bin may also include a first integral carriage assembly including a first set of wheels for rolling the first storage bin over a supporting surface. Further the first removable storage bin may include a lock mechanism for locking the storage bin in the first storage cavity. In an alternative embodiment another lock mechanism functions to lock a cover on the storage bin in the closed position.

The storage bin system may further include a second cargo compartment sidewall including a second storage cavity having a second rearwardly oriented access opening and a second removable storage bin received and held in the second storage cavity. The second removable storage bin may further include a second housing having a second portion that closes the second access opening when the second removable storage bin is stowed in the second storage cavity and is concealed from view when the liftgate is closed. Further, the second removable storage bin may include a second handle and a second locking mechanism.

Still further, the storage bin system may further include a mechanism that interlocks the first handle on the first removable storage bin with a second handle on the second removable storage bin when the first and second removable storage bins have been removed from the storage cavities. This allows the two storage bins to be manipulated as a single device and, for example, rolled on integral carriage assemblies located on each storage bin.

In one possible embodiment, one or both removable storage bins includes a housing made from a thermal insulating material thereby allowing the storage bin to be utilized as a cooler to maintain food and/or beverages in a hot or cold condition as desired.

In still another possible embodiment the first removable storage bin includes an electronic device dock for receiving and holding an electronic device such as a smart phone or music player. In such a device, at least a portion of the storage bin is shaped to naturally amplify sound from the electronic device docked to the electronic device dock.

In another possible embodiment, the first removable storage bin includes a housing having an open top and the first cargo compartment sidewall includes a pivoting panel aligned with the open top of the first removable storage bin when the first removable storage bin is stowed in the first storage cavity. This allows access to the storage bin from inside the motor vehicle. In such an embodiment, the first cargo compartment sidewall may further include a lock for securing the pivoting panel in a closed position thereby providing security for items stored in the storage bin.

In accordance with an additional aspect, a method is provided of storing an object in a motor vehicle. That method comprises the steps of: (a) placing the object into a storage bin, (b) opening a liftgate of the motor vehicle to expose an access opening to a storage cavity provided in a storage compartment sidewall of the motor vehicle and (c) sliding the storage bin into the storage cavity.

That method may further include the step of closing the liftgate over the access opening to conceal the storage bin in the storage compartment sidewall. Still further, the method may include the steps of opening the liftgate to expose the storage bin and sliding the storage bin out of the storage cavity in order to access the items contained therein.

In the following description, there are shown and described several preferred embodiments of the storage bin system. As it should be realized, the storage bin system is capable of other, different embodiments and its several details are capable of modification in various, obvious aspects all without departing from the storage bin system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the storage bin system and together with the description serve to explain certain principles thereof. In the drawing figures.

Reference will now be made in detail to the present preferred embodiments of the storage bin system, examples of which are illustrated in the accompanying drawing figures.

DETAILED DESCRIPTION

Figure 1:
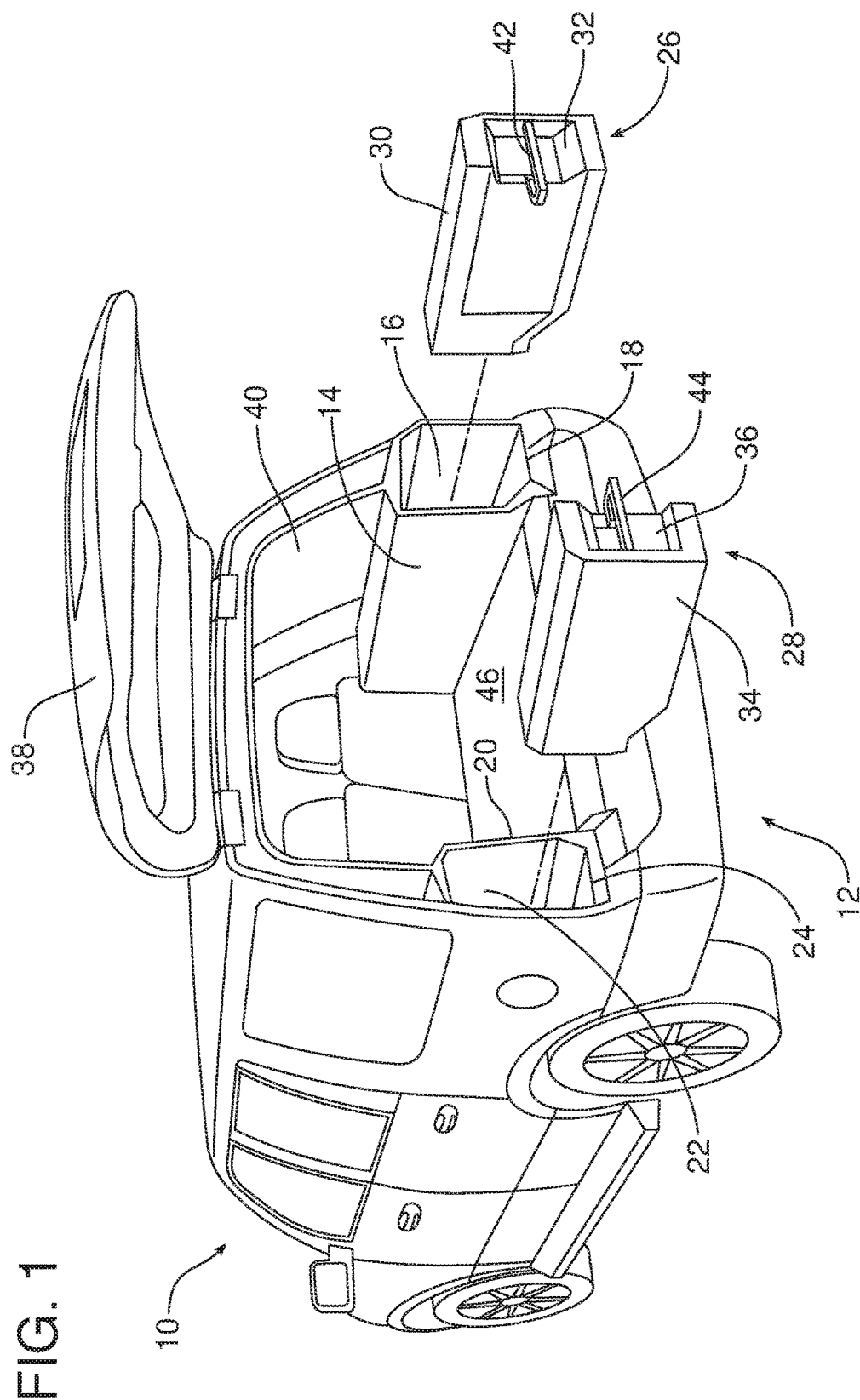
FIG. 1 is a partially exploded view of an SUV equipped with the storage bin system showing the first and second removable storage bins removed from the respective first and second storage cavities in the cargo compartment sidewalls of the SUV.
Figure 2:
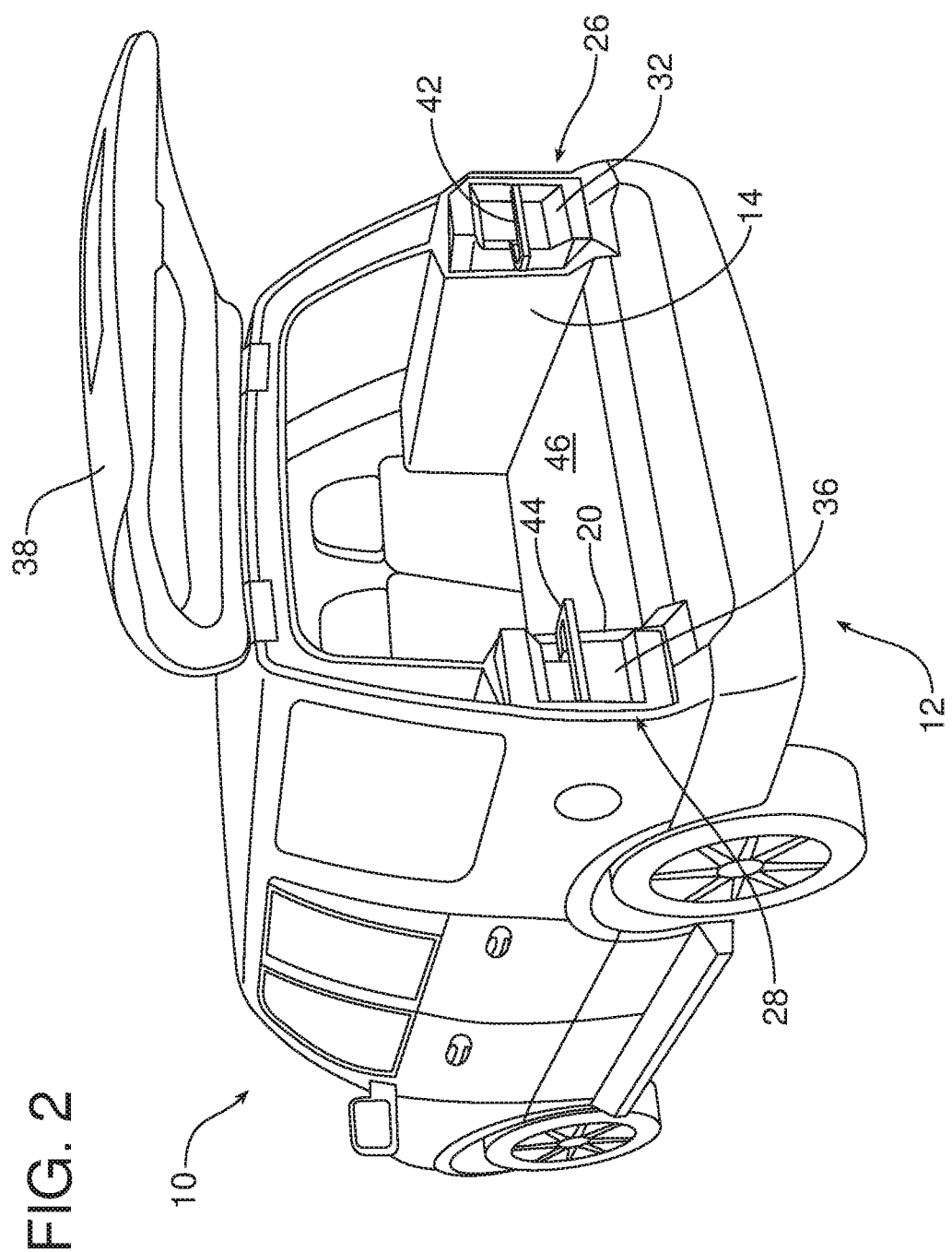
FIG. 2 is a perspective view similar to FIG. 1 showing the first and second storage bins stowed in the first and second storage cavities in the cargo compartment sidewalls of the SUV.

Reference is now made to FIGS. 1 and 2 illustrating a motor vehicle in the form of an SUV 10 equipped with the storage bin system 12. As illustrated, the storage bin system 12 includes a first cargo compartment sidewall 14 on one side of the SUV 10 including a first storage cavity 16 having a first rearwardly oriented access opening 18.

Similarly, the storage bin system 12 includes a second cargo compartment sidewall 20 having a second storage cavity 22 with a second rearwardly oriented access opening 24. As illustrated, a first removable storage bin 26 is received and held in the first storage cavity 16. Similarly, a second removable storage bin 28 is received and held in the second storage cavity 22.

As should be appreciated, the first storage bin 26 includes an outer housing 30 having a rear wall or portion 32 that closes the first access opening 18 when fully seated in the first storage cavity. Similarly, the second removable storage bin 28 includes a housing 34 having a rear portion or a wall 36 that closes the second access opening 24 when the second storage bin 28 is fully seated in the second storage cavity 22.

When the liftgate 38 of the SUV 10 is opened, the first and second access openings 18, 24 are exposed to receive their respective first and second storage bins 26, 28. Those storage bins 26, 28 are sized and shaped to perfectly nest inside the two cavities 16, 22 with the rear portions or walls 32, 36 fitting flush and closing the access openings 18, 24. When the liftgate 38 is then closed, the liftgate covers and conceals the storage bins 26, 28 within the cargo compartment sidewalls 14, 20 so that it is impossible to even know that they are there.

When one then wishes to remove the storage bins 26, 28 from the storage cavities 16, 22, one again opens the liftgate 38 and then slides the storage bins 26, 28 rearwardly through the liftgate opening 40 until the storage bins are free of the SUV 10 and may be used to carry objects contained therein to a remote location if desired.

Here it should be appreciated that a first handle 42 is provided on the rear portion 32 of the first storage bin housing 30. Similarly, a second handle 44 is provided on the rear portion 36 of the second storage bin housing 34. Thus, both handles 42, 44 are oriented toward the liftgate opening 40 and easily accessed when the liftgate 38 is opened in order to manipulate the storage bins 26, 28 between the stowed positions within the respective storage cavities, 16, 22 and the removed positions for use. As should be appreciated, when the first and second storage bins 26, 28 are fully seated in the respective first and second storage cavities 16, 22, the first and second handles 42, 44 may project beyond the inner surface of the cargo compartment sidewalls 14, 20 so as to provide a convenient tie down point for cargo being carried in the cargo area 46 of the SUV 10.

Figure 3:
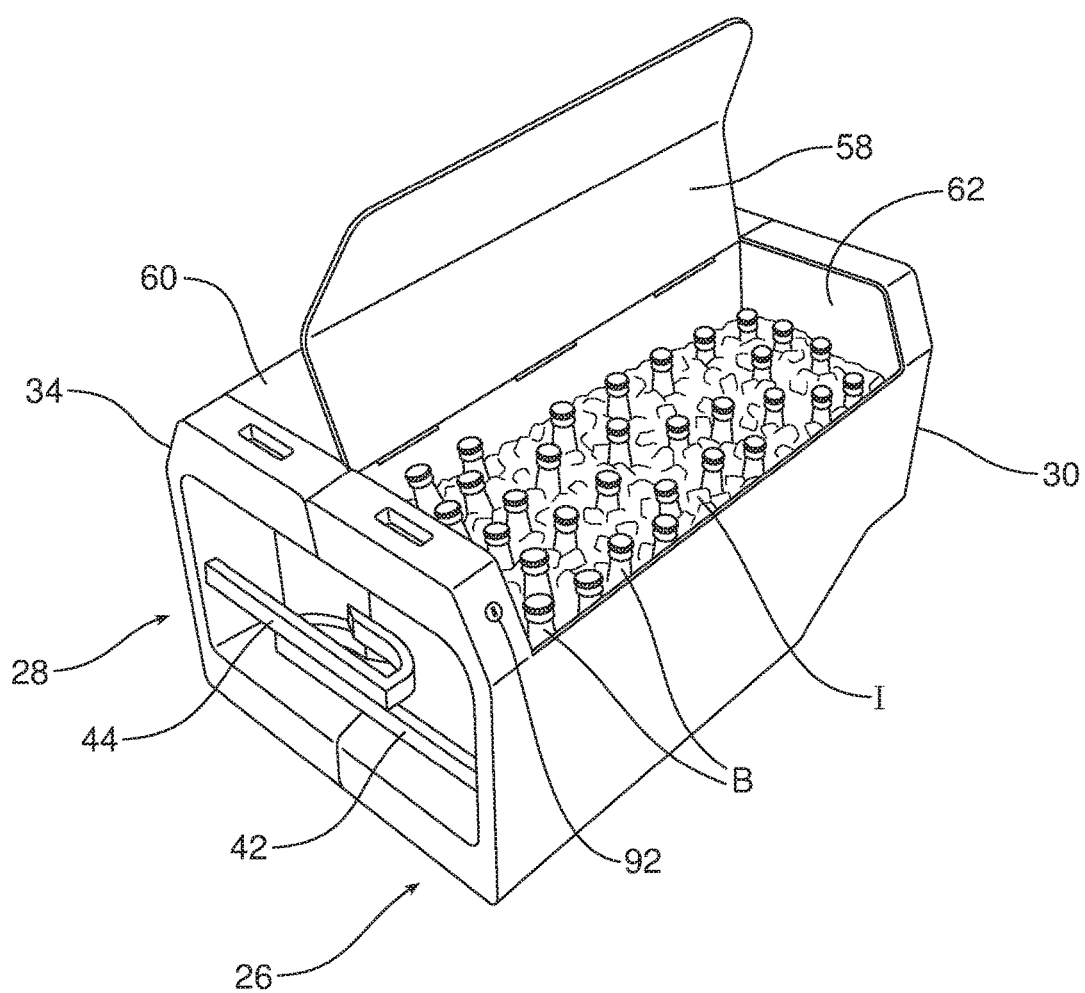
FIG. 3 is a perspective view of the first and second storage bins removed from the storage cavities and attached together. A pivoting cover on one of the storage bins is opened showing a plurality of bottles being cooled in ice held in the storage bin.
Figure 4A:
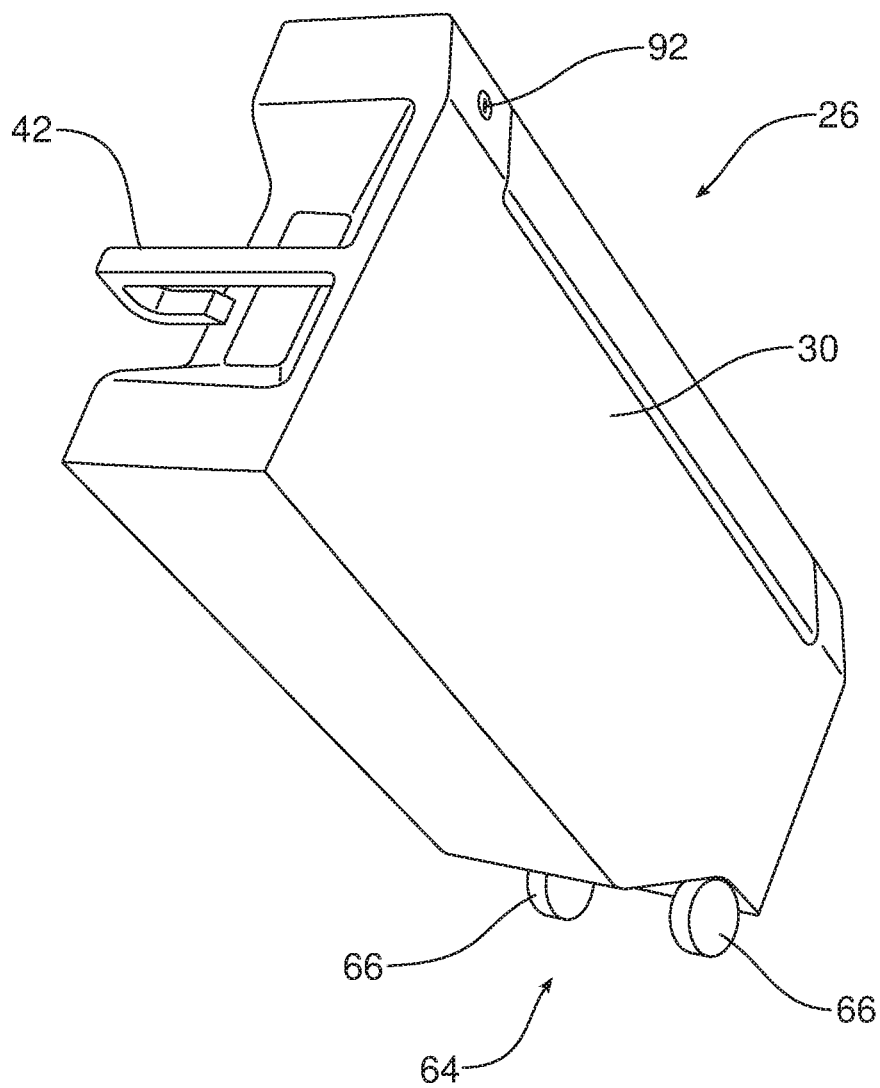
FIG. 4a is a perspective view of a single storage bin supported on an integral carriage assembly for rolling along the ground.
Figure 4B:
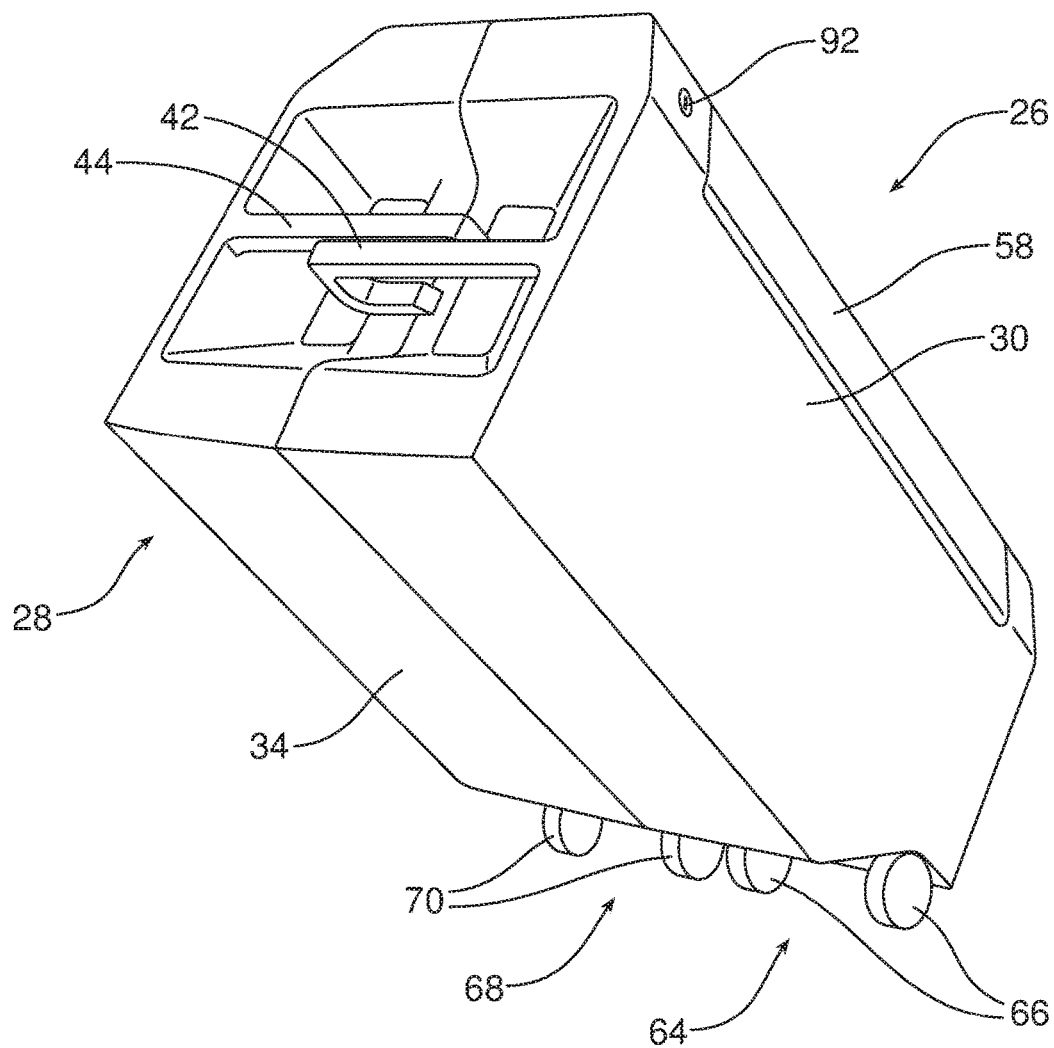
FIG. 4b is a view similar to 4a showing two storage bins connected together and supported on integral carriage assemblies for rolling along the ground.

As best illustrated in FIGS. 3 and 4b, when the two storage bins 26, 28 are removed from the SUV 10, they may be connected together so as to be manipulated as a single object. Thus, the storage bins 26, 28 include a mechanism 50 to interlock the first and second handles 42, 44 together and a cooperating interlocking structure (not shown) that plugs together at the opposite end of the bins 26, 28 from the handles. Appropriate fasteners such as clips, bolts or the like could also be used to interconnect the storage bins 26, 28.

As further illustrated, the first storage bin 26 includes a first pivoting cover 58 while the second storage bin 28 includes a second pivoting cover 60. In FIG. 3, the first pivoting cover 58 is shown hinged open to display the interior compartment 62 of the bin 26 holding glass bottles B in ice I. Thus, it should be appreciated that one or both storage bins 26, 28 may include a housing 30, 34 made from a thermal insulating material. Thus, the bins 26, 28 may function to maintain hot food and beverages hot or cold food and beverages cold as desired.

As best illustrated in FIGS. 4a and 4b, the first removable storage bin 26 may include a first integral carriage assembly 64, including a first set of wheels 66 for rolling the first storage bin over a supporting surface such as a floor. Similarly, the second removable storage bin 28 may include a second integral carriage assembly 68 including a second set of wheels 70 for serving the same function. As should be appreciated from reviewing FIG. 4b, the two integral carriage assemblies 64, 68 function together to support the two storage bins 26, 28 when they are interconnected so that they may be rolled freely along the ground using the interlock handles 42, 44.

Figure 5:
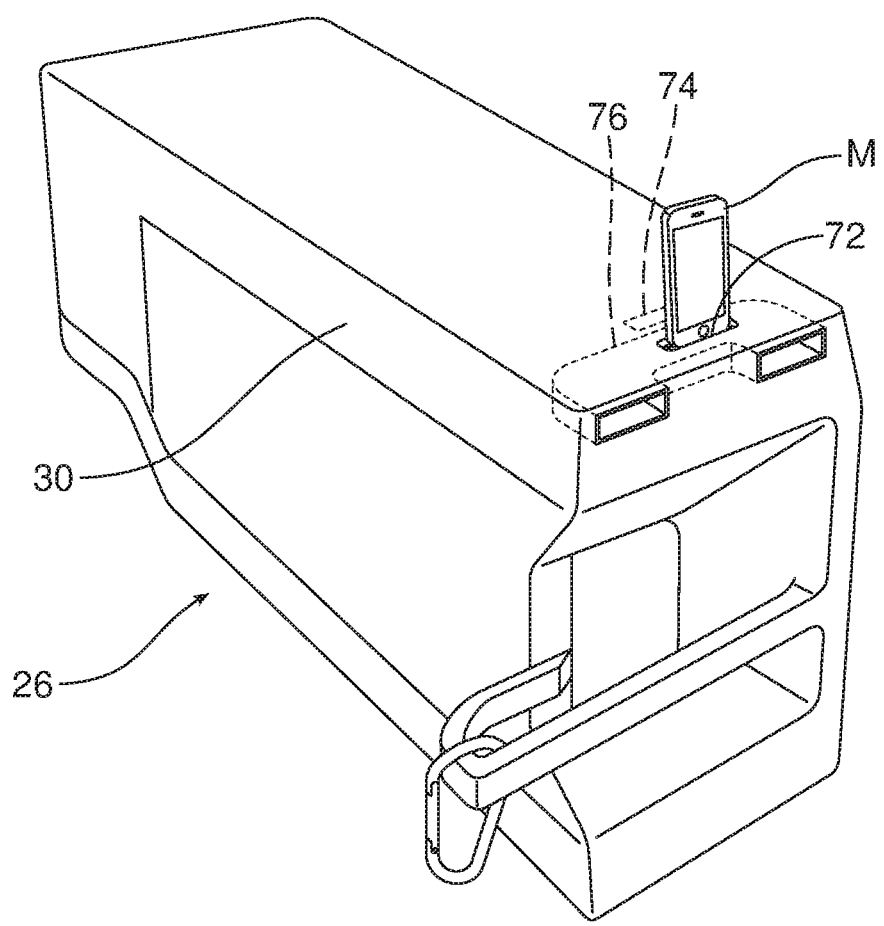
FIG. 5 is a perspective view of yet another embodiment of the storage bin assembly including an electronic device dock for holding a music player.
Figure 5A:
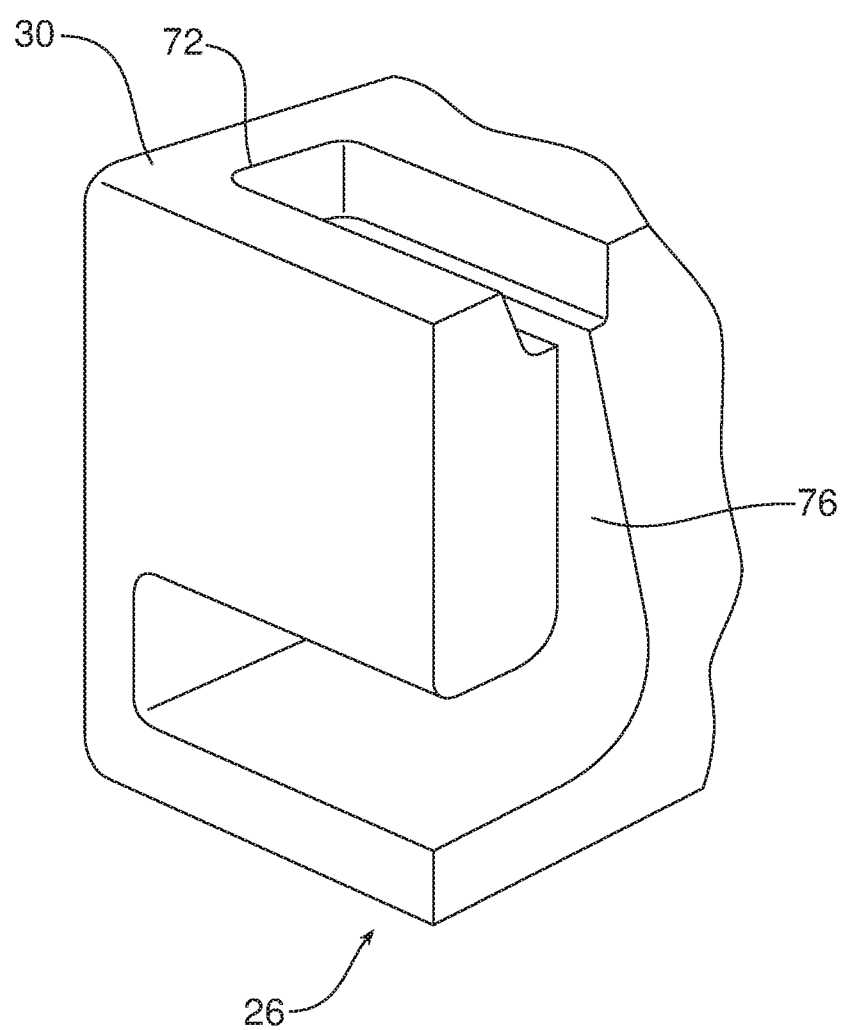
FIG. 5a is a schematic cross-sectional view illustrating an embodiment of storage bin incorporating an electronic dock for holding a music player and an expanding sound passageway shaped to amplify sound from that music player.

In an alternative embodiment illustrated in FIG. 5, the storage bin 26 includes an electronic device dock 72 for receiving and holding an electronic device such as a smart phone or music player M. A battery or charging system, schematically illustrated at 74, may be provided with the electronic device dock to charge or power any electronic device M docked thereto. Further, as illustrated in schematic cross section in the FIG. 5a embodiment, the storage bin 26 may include at least a portion 76 shaped to naturally amplify the sound from the electronic device M docked to the device dock 72. In the illustrated embodiment, the amplifier section 76 comprises an expanding sound passageway.

Figure 6A:
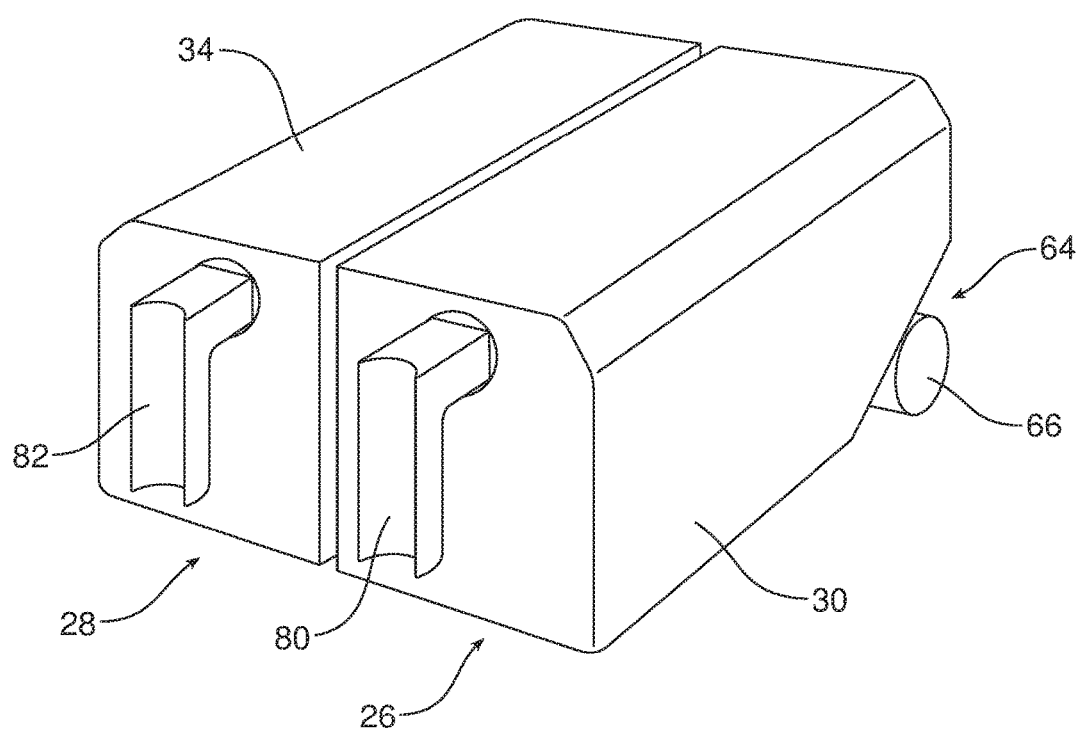
FIGS. 6a and 6b are perspective views illustrating an alternative embodiment including handles that may be rotated between a first, separated position and a second, interlocking position.
Figure 6B:
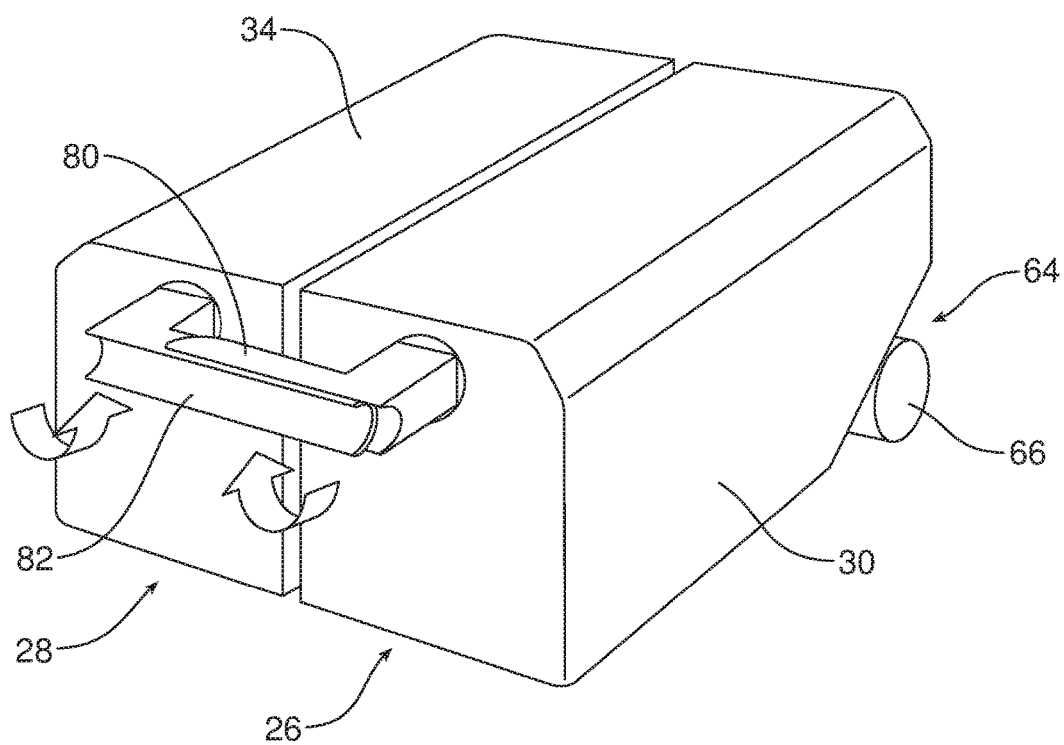

Reference is now made to FIGS. 6a and 6b illustrating another alternative embodiment of the storage bin system 12. In this embodiment, the first and second storage bins 26, 28 include respective rotating handles 80, 82. As illustrated, the handles 80, 82 are both L-shaped. Both handles 80, 82 may be pointed downward if desired as illustrated in FIG. 6a so as to point toward the sides of the housings 30, 34 including the carriage assemblies 64, 68. In contrast, as illustrated in FIG. 6b, the handles may be rotated toward each other and interlocked with the second handle 82 nesting inside the first handle 80 to hold the storage bins 26, 28 together.

Figure 7:
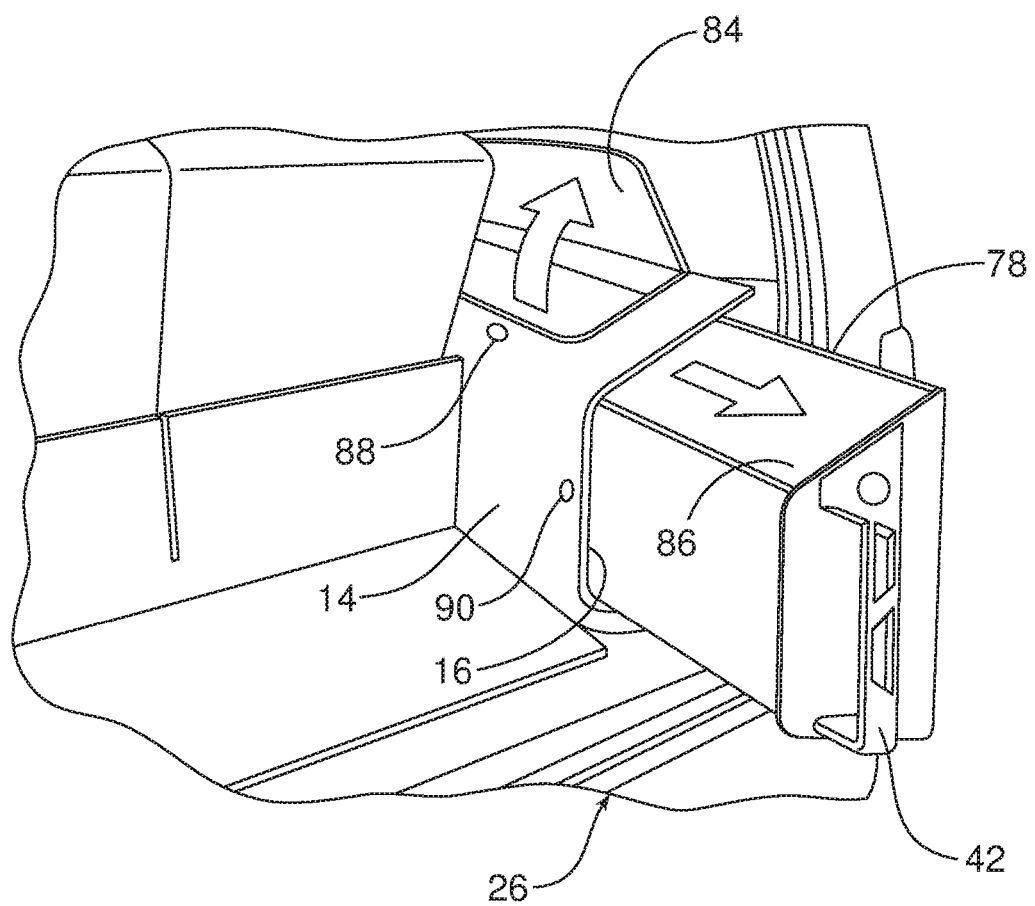
FIG. 7 is a perspective view of yet another alternative embodiment of the storage bin wherein the storage bin incorporates an open top and the cargo compartment sidewall includes a pivoting panel aligned with the open top of the storage bin when the storage bin is stowed in the first storage cavity thereby allowing access to the storage bin when in the storage position.

Reference is now made to FIG. 7 illustrating yet another possible embodiment of the storage bin system 12. In this embodiment, the first removable storage bin 26 includes an open top 78. In addition, the first cargo compartment sidewall 14 includes a pivoting panel 84 that is aligned with the open top 78 of the bin 26 when the bin is properly seated and stowed in the first storage cavity 16. Thus, it should be appreciated that one may access the storage compartment 86 within the storage bin 26 by opening the panel 84. A lock mechanism 88 may be provided to lock the panel 84 in a closed position. Similarly, a locking mechanism 90 may be provided to lock the storage bin 26 in the first storage cavity 16. Together, the two locking mechanisms 88, 90 provide full security for any contents contained in the storage compartment 86 of the storage bin.

Consistent with the above description, a method is provided for storing an object in a motor vehicle or SUV 10. That method comprises the steps of placing the object into a storage bin 26 or 28, opening a liftgate 38 of the SUV 10 to expose an access opening 18 or 24 to a storage cavity 16 or 22 in a storage compartment sidewall 14 or 20 of the SUV and sliding the storage bin into the storage cavity. Further, the method includes the step of closing the liftgate 38 over the access opening 18 or 24 to conceal the storage bin 26 or 28 in the storage compartment sidewall 14 or 20. Still further, the method may include the steps of opening the liftgate 38 to expose the storage bin 26 or 28 and sliding the storage bin out of the storage cavity 16 or 22.

The foregoing has been presented for purposes of illustration and description. It is not intended to be exhaustive or to limit the embodiments to the precise form disclosed. Obvious modifications and variations are possible in light of the above teachings. For example, as illustrated in FIG. 3, each storage bin 26, 28 may include a lock mechanism 92 for securely locking the pivoting covers 58, 60 of the storage bin in the closed position to thereby securely maintain the contents in the storage bin. All such modifications and variations are within the scope of the appended claims when interpreted in accordance with the breadth to which they are fairly, legally and equitably entitled.

What is claimed:

1. A storage bin system for a motor vehicle, comprising:
a first cargo compartment sidewall including a first storage cavity having a first rearwardly oriented access opening; and
a first removable storage bin received and held in said first storage cavity, wherein said first removable storage bin includes a first integral carriage assembly including a first set of wheels for rolling said first removable storage bin over a supporting surface.

2. The storage bin system of claim 1, wherein said first removable storage bin includes a first housing having a first portion that closes said first access opening when said first removable storage bin is stowed in said first storage cavity.

3. The storage bin system of claim 2, wherein said first portion is fully concealed when a liftgate of said motor vehicle is closed and fully exposed when said liftgate of said motor vehicle is opened.

4. A storage bin system for a motor vehicle, comprising:
a first cargo compartment sidewall including a first storage cavity having a first rearwardly oriented access opening; and
a first removable storage bin received and held in said first storage cavity, wherein said first removable storage bin includes a first housing having a first portion that closes said first access opening when said first removable storage bin is stowed in said first storage cavity, and wherein said first removable storage bin includes a housing having an open top and said first cargo compartment sidewall includes a pivoting panel aligned with said open top of said first removable storage bin when said first removable storage bin is stowed in said first storage cavity.

5. A storage bin system for a motor vehicle, comprising:
a first cargo compartment sidewall including a first storage cavity having a first rearwardly oriented access opening; and
a first removable storage bin received and held in said first storage cavity, wherein said first removable storage bin includes a first handle, a first housing having a first portion that closes said first rearwardly oriented access opening when said first removable storage bin is stowed in said first storage cavity, and a first integral carriage assembly having a first set of wheels for rolling said first removable storage bin over a supporting surface, and wherein said first handle projects into a cargo area of said motor vehicle past said first cargo compartment sidewall when said first removable storage bin is stowed in said first rearwardly oriented access opening.

6. The storage bin system of claim 1, wherein said first removable storage bin includes an electronic device dock.

7. The storage bin system of claim 5, wherein said first removable storage bin includes a lock mechanism.

8. The storage bin system of claim 5, further including (a) a second cargo compartment sidewall including a second storage cavity having a second rearwardly oriented access opening and (b) a second removable storage bin received and held in said second storage cavity.

9. The storage bin system of claim 8, wherein said second removable storage bin includes a second housing having a second portion that closes said second access opening when said second removable storage bin is stowed in said second storage cavity and is concealed from view when said liftgate is closed.

10. The storage bin system of claim 9, including a second handle on said second removable storage bin.

11. The storage bin system of claim 10, further including a mechanism that interlocks said first handle and said second handle so as to join said first removable storage bin with said second removable storage bin when said first removable storage bin and said second removable bin have been removed from said first storage cavity and said second storage cavity.

12. The storage bin system of claim 11, wherein said second removable storage bin includes a second integral carriage assembly including a second set of wheels for rolling said second removable storage bin over a supporting surface.

13. The storage bin system of claim 12, wherein at least one of said first removable storage bin and said second removable bin includes a housing made from a thermal insulating material.

14. The storage bin system of claim 6, wherein said first removable storage bin is shaped to naturally amplify sound from an electronic device docked to said electronic device dock.

15. The storage bin system of claim 4, wherein said first cargo compartment sidewall includes a lock for securing said pivoting panel in a closed position.

* * * * *